United States Patent

Ingram et al.

Patent Number: 5,339,485
Date of Patent: Aug. 23, 1994

[54] CUTTING TORCH TIP CLEANER

[76] Inventors: Bill Ingram, Rt. 7, 11429 W. 20th, Odessa, Tex. 79763; George Spector, 233 Broadway Rm. 702, New York, N.Y. 10279

[21] Appl. No.: 109,246

[22] Filed: Aug. 20, 1993

[51] Int. Cl.⁵ .............................. B08B 9/02
[52] U.S. Cl. .................. 15/236.06; 15/104.001; 15/104.05; 15/104.16
[58] Field of Search .............. 15/1, 104.001, 104.03, 15/104.05, 104.16, 200, 201, 236.05, 236.06, 236.08, 236.09

[56] References Cited

U.S. PATENT DOCUMENTS

| | | | |
|---|---|---|---|
| 634,328 | 10/1899 | Freeman | 15/201 |
| 795,062 | 7/1905 | Pollmann | 15/236.08 |
| 889,777 | 5/1908 | Barnard | 15/104.05 |
| 2,226,317 | 12/1940 | Myers | 15/104.001 |
| 2,251,626 | 8/1941 | Hertzberg | 15/200 |
| 2,556,691 | 6/1951 | Harshbarger | 15/236.06 |
| 3,315,295 | 4/1967 | Jeter, Jr. et al. | 15/104.001 |
| 3,414,925 | 12/1968 | Stavros | 15/236.08 |
| 3,994,040 | 11/1976 | Di Stefano | 15/236.06 |
| 4,086,678 | 5/1978 | Torr | 15/236.06 |
| 4,595,136 | 6/1986 | Cooper | 15/104.05 |
| 4,958,401 | 9/1990 | Kurz | 15/104.16 |

FOREIGN PATENT DOCUMENTS

| | | | |
|---|---|---|---|
| 891813 | 10/1953 | Fed. Rep. of Germany | 15/104.05 |
| 57981 | 5/1937 | Norway | 15/104.001 |
| 600243 | 6/1978 | Switzerland | 15/104.05 |

Primary Examiner—Timothy F. Simone
Assistant Examiner—Mark Spisich

[57] ABSTRACT

A cleaner is provided for a cutting torch tip having a plurality of orifices in a particular arrangement which consists of a cylindrical body and a plurality of stainless steel wires extending from the body in the same pattern arrangement as the orifices in the cutting torch tip. The wires can be inserted within the orifices at the same time to simultaneously clean all of the orifices. In a modification each wire swivels and is mounted within the body and includes a flexible metal flap, with a relatively stiff tapered head along its free edge for scraping, which will rotate when inserted into one orifice to produce a better cleaning action therein.

2 Claims, 1 Drawing Sheet

CUTTING TORCH TIP CLEANER

BACKGROUND OF THE INVENTION

The instant invention relates generally to cleaning devices and more specifically it relates to a cleaner for a cutting torch tip, which provides a plurality of wires in a pattern as the orifices in the cutting torch tip, so as to clean all the orifices simultaneously.

There are available various conventional cleaning devices which do not provide the novel improvements of the invention herein disclosed.

SUMMARY OF THE INVENTION

A primary object of the present invention is to provide a cleaner for a cutting torch tip that will overcome the shortcomings of the prior art devices.

Another object is to provide a cleaner for a cutting torch tip that will simultaneously clean all the orifices in the cutting torch tip by an arrangement of stainless steel wires in the same pattern as the orifices which are lined up and inserted at the same time.

An additional object is to provide a cleaner for a cutting torch tip in which each wire is modified to contain a flexible metal flap with a relatively stiff tapered head for scraping, which will rotate when inserted in one orifice to produce a better cleaning action.

A further object is to provide a cleaner for a cutting torch tip that is simple and easy to use.

A still further object is to provide a cleaner for a cutting torch tip that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
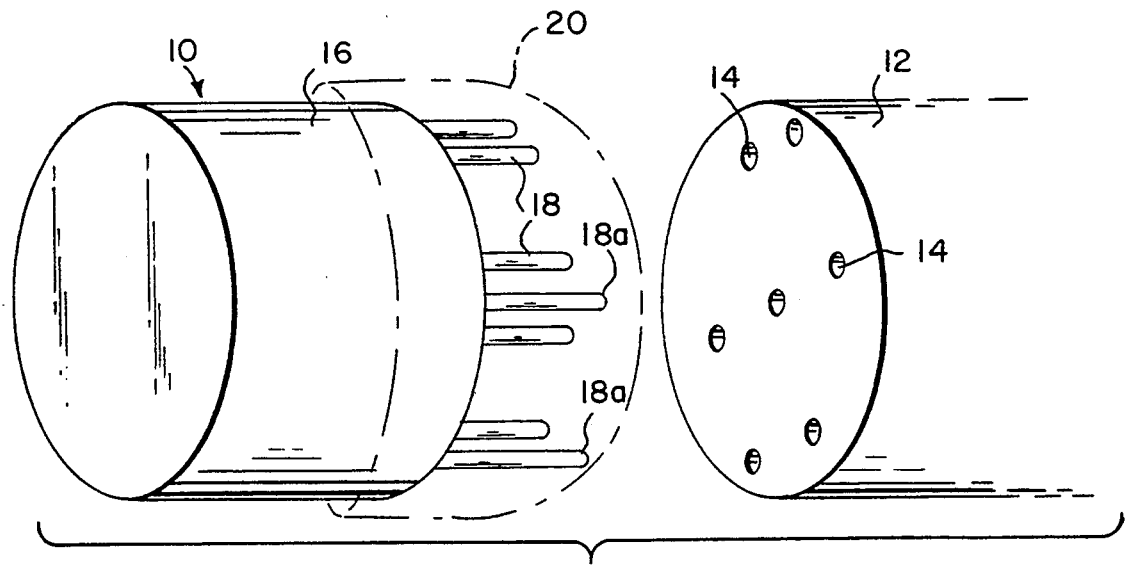
FIG. 1 is a perspective view of the instant invention ready to clean the orifices in a cutting torch tip, with the safety storage cap shown in phantom.

Turning now descriptively to the drawings, in which similar reference characters denote similar elements throughout the several views, FIG. 1 illustrates a cleaner 10 for a cutting torch tip 12 having a plurality of orifices 14 in a particular arrangement. The cleaner 10 contains a cylindrical body 16. A plurality of stainless steel wires 18 extend from the body 16 in the same pattern arrangement as the orifices 14 in the cutting torch tip 12. The wires 18 can be inserted within the orifices 14 at the same time, to simultaneously clean all of the orifices 14.

Some of the wires 18a are longer than the others, so that the wires 18 and 18a can be properly lined up with the orifices 14 to be inserted therein. A safety storage cap 20, shown in phantom, is to be placed onto the body 16 over the wires 18 and 18a when not in use.

Figure 2:
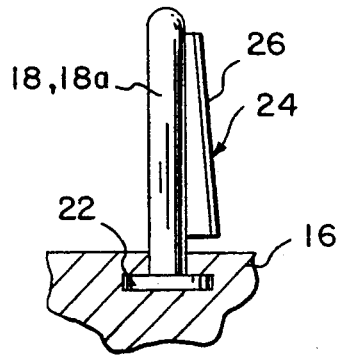
FIG. 2 is an elevational view of a modified wipe which rotates within the cleaner having a tapered flexible metal flap.
Figure 3:
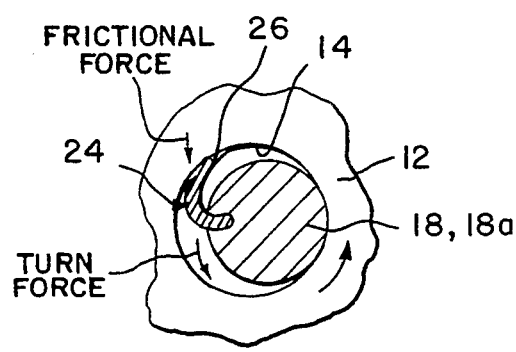
FIG. 3 is a top view of one of the orifices in the cutting torch tip with the modified wire and flap in cross section therein, which will rotate when inserted.
Figure 4:
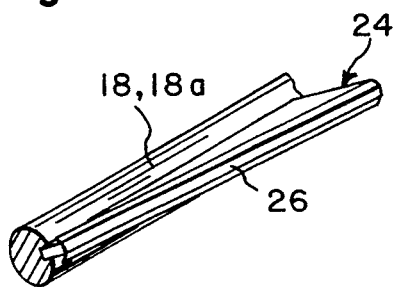
FIG. 4 is a perspective view of a portion of the modified wire and tapered flexible flap which bends when inserted in the orifice, causing rotation of the cleaning wire thus for better cleaning action.

FIGS. 2 through 4 show a modification, in which each wire 18 and 18a swivels and is mounted by a flange 22 within the body 16 and includes a flexible metal flap 24 with a relatively stiff tapered head 26 along its free edge for scraping which will rotate when inserted into one orifice 14 to produce a better cleaning action therein.

OPERATION OF THE INVENTION

To use the cleaner 10, a person simply grips the body 16 and removes the safety storage cap 20. The wires 18 and 18a are then inserted within the orifices 14 in the cutting torch tip simultaneously cleaning all of the orifices 14 at the same time. When using the modification the turn force of the wires 18 and 18a will cause the flexible metal flap 24 to bend, so that the frictional force of the tapered head 26 will better clean the orifices 14.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cleaner for a cutting torch tip having a plurality of orifices with walls in a particular arrangement which comprises:
   a) a cylindrical body;
   b) a plurality of stainless steel wires extending from said body in the same said arrangement as said orifices in the cutting torch tip, so that said wires can be inserted within the orifices at the same time to simultaneously clean all of the orifices; wherein some of said wires are longer than the others, so that said wires can be properly lined up with said orifices to be inserted therein, further including a safety storage cap to be placed onto said body over said wires when not in use; wherein each said wire is rotatably mounted within said body and includes a flexible metal flap with a free edge and a relatively stiff tapered head for engaging said walls along said free edge for scraping, which will rotate when inserted into each said orifice to produce a better cleaning action therein.

2. A cleaner for a cutting torch tip having a plurality of orifices with walls in a particular arrangement which comprises:
   a) a cylindrical body; and
   b) a plurality of stainless steel wires extending from said body in the same said arrangement as said orifices in the cutting torch tip, so that said wires can be inserted within the orifices at the same time to simultaneously clean all of the orifices, wherein each said wire is rotatably mounted within said body and includes a flexible metal flap with a free edge and a relatively stiff tapered head for engaging said walls along said free edge for scraping, which will rotate when inserted into each said orifice to produce a better cleaning action therein.

* * * * *